Figure 1:
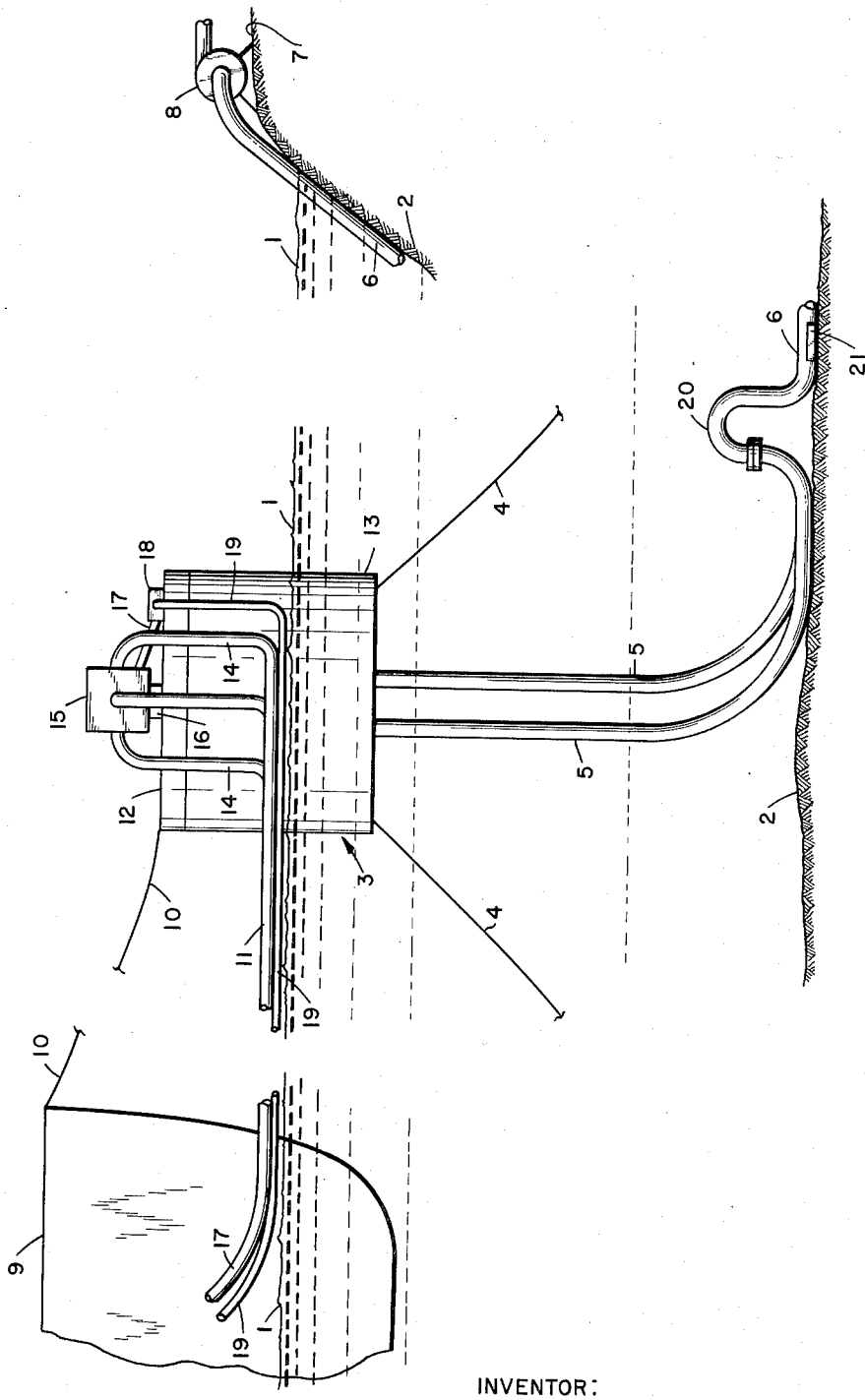

Oct. 12, 1965    P. BOELHOUWER    3,211,127
LOADING BUOY
Filed Jan. 9, 1963    2 Sheets-Sheet 1

INVENTOR:
PIETER BOELHOUWER,
BY: *H. D. Busch*
HIS ATTORNEY

INVENTOR:
PIETER BOELHOUWER
BY: H.D. Buck
HIS ATTORNEY

3,211,127
LOADING BUOY

Pieter Boelhouwer, The Hague, Netherlands, assignor to Shell Oil Company, New York, N.Y., a corporation of Delaware
Filed Jan. 9, 1963, Ser. No. 250,342
Claims priority, application Netherlands, Jan. 11, 1962, 273,419
7 Claims. (Cl. 116—70)

The invention relates to a loading buoy with at least one main line for unloading and/or loading tankers or other movable reservoirs.

As is known loading buoys of this type may be anchored at sea and be connected by hoses, for example, on the one hand to pipelines leading to an oil storage tank, and on the other to a tanker. Although the hoses used may nowadays very well be of such a quality that there is no danger of the hose rupturing, in some countries the authorities require measures to be taken to ensure that if the hose should rupture there would be no risk of serious pollution of the water and shore.

Accordingly, the object of the invention is to provide a loading buoy which is fitted with such members that, if the hose ruptures liquid outflow can be minimized, but without causing delays when the lines are intact.

According to the invention to this end the loading buoy is provided with a signal device connected to the main line and designed to transmit a signal only if there is a rapid decrease in the pressure in the main line, starting from a pressure which is at least equal to a predeterminable operating pressure ($p_o$).

The invention is based on the conception that when the hose ruptures the change in pressure in the main line differs entirely from that occurring when a valve in the line is gradually closed and that it should therefore be possible to design a signal device of the type which gives a signal when the hose ruptures but not when a valve in the line is gradually closed.

The signal device is preferably provided with a differential pressure transmitter the output pressure of which depends on the pressure in a first auxiliary line minus the pressure in a seocnd auxiliary line, the second auxiliary line being so connected to the main line that the pressure in the said second auxiliary line is invariably substantially equal to the pressure ($p_h$) in the main line, the first auxiliary line being so connected to the main line in that if the pressure in the main line exceeds a second predeterminable value ($p_1$)— which is less than ($p_o$)—, in case there is a pressure decrease in the main line the pressure in the first auxiliary line decreases more gradually than the pressure in the main line and the second auxiliary line, but if the pressure in the first auxiliary line is at most equal to the said second predeterminable value ($p_1$) the pressure in the first auxiliary line is invariably equal to the pressure in the main line and the second auxiliary line.

To this end the main line may be connected to the first auxiliary line via a restriction and an expansion chamber. The expansion chamber is then preferably provided with a movable wall which is subjected by the action of a resilient member to a force in one direction and by excess pressure in the expansion chamber to a force in the opposite direction, while the movement of this wall caused by the action of the resilient member is defined by a stop. The expansion chamber is preferably a cylinder in which a piston is adapted to move, which piston is provided on one side with a compression spring, while the cylinder is provided with an adjustable stop adapted to prevent complete expansion of the compression spring and the side of the cylinder provided with a compression spring communicates with the atmosphere through an opening.

Preferably the restriction is adjustable, a connecting line between the restriction and the main line issues into the second auxiliary line and means are provided for filling the two auxiliary lines, the expansion chamber and the constriction with a liquid other than that to be transported in the main line.

The signal device may, for example, be energized by a gas cylinder to be arranged on the loading buoy. This or another gas cylinder may be used to energize a pneumatic relay with a reset device, which relay is connected to a line in which the output pressure of the said differential pressure transmitter prevails. The said relay gives a continuous signal which continues to be transmitted until the restoring device of the relay is operated after the pressure in this line exceeds a third predeterminable pressure ($p_s$).

Preferably an alarm device is arranged on the buoy which can be actuated by the said continuous signal and there is a line which can transmit this signal from the loading buoy to a tanker moored to the loading buoy.

Figure 2:
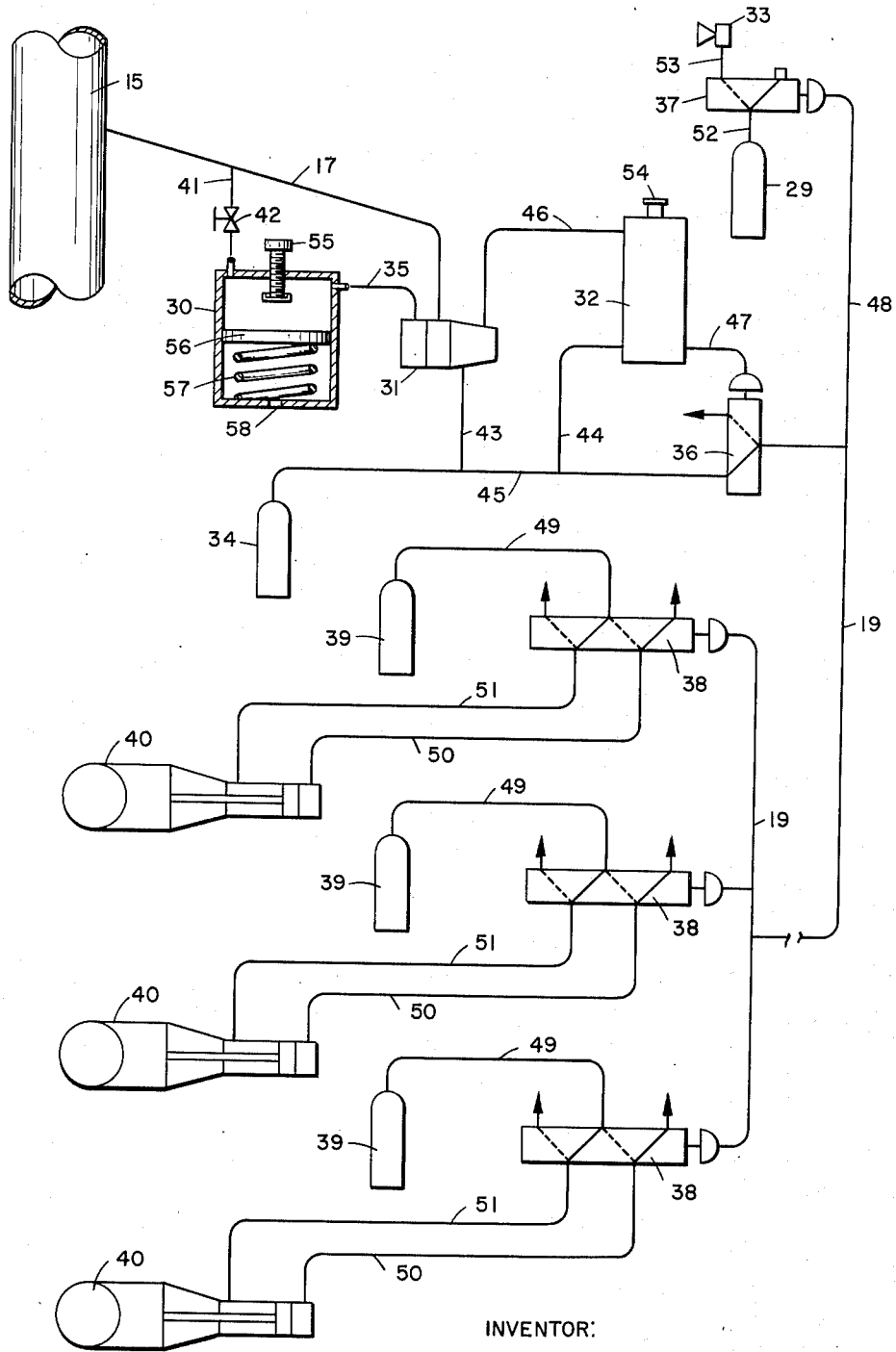

The invention will now be further illustrated with reference to the diagrammatic drawing wherein:

FIG. 1 represents a loading buoy according to the invention anchored at sea and a tanker moored thereto, and FIG. 2 is an embodiment of the signal device.

Referring to FIG. 1, in which the water is considered to be transparent, 1 designates the surface of the sea and 2 the sea-bed. A loading buoy 3 is anchored in the sea by means of anchor chains 4. The loading buoy is connected by means of hoses 5 to pipelines 6 lying on the sea-bed and leading to pumps 8 positioned on the shore 7.

A tanker 9 which is to be unloaded is moored to the loading buoy 3 by means of mooring cables 10 and connected to the loading buoy by means of hoses 11 (only one being shown).

The loading buoy is provided with a turntable 12, which is rotatable relative to the floating body 13 of the loading buoy, to which turntable are secured the mooring cables 10. A suitable construction for the buoy and turntable is shown in Patent No. 2,894,268. The hoses 11 are connected to the hoses 5 via lines 14, which are secured to the turntable 12, a swivelling main line 15 and a fixed main line 16, the main lines 15 and 16 being connected to each other by means of a swivel coupling.

The swivelling main line 15 is connected via an auxiliary line 17 to a signal device 18 which is connected to the tanker 9 via a line 19.

To unload the tanker 9 use may be made of a pump installation on board the tanker, the shore-pump 8 being capable of acting as booster pumps. To load a tanker use may be made of shore-pumps. To terminate unloading or loading, first a valve (not shown) in each of the various delivery lines is gradually closed, and afterwards the pumps are stopped.

FIG. 2 shows an expansion chamber 30, a differential pressure transmitter 31, a pneumatic relay 32, an air whistle 33, gas cylinders 34 and 29 containing compressed gas and pneumatic three-way valves 36 and 37 which are the parts of the signal device 18 on the turntable 12, and a plurality of pnuematic four-way valves 38, gas cylinders 39 and pnuematic valves 40 which may be secured between the hoses 11 and the hose connections on board the tanker 9. One outlet of the three-way valve 37 is closed.

The auxiliary line 17 and the expansion chamber 30 are connected by connecting line 41 to an adjustable restriction 42, e.g., a needle valve. The gas cylinder 34 is connected to the differential pressure transmitter 31 by a line 43, to the relay 32 by a line 44 and to the three-way valve 36 by a line 45. The differential pressure transmitter 31 and the expansion chamber 30 are connected by an auxiliary line 35. The relay 32 is connected to the differential pressure transmitter 31 by a line 46 and to the three-way valve 36 by a line 47. The three-way valve 36 is connected to the three-way valve 37 by a line 48 and to the four-way valves 38 by the long, flexible line 19. The four-way valves 38 are connected to the gas cylinders 39 by line 49 and to the pneumatic valves 40 by the closing lines 50 and the opening lines 51. The three-way valve 37 is connected to the gas cylinder 29 by a line 52 and to the air whistle 33 by a line 53.

The relay 32 is provided with a reset knob 54.

The expansion chamber 30 is a cylinder containing a movable piston 56. Under the piston 56 there is a compression spring 57 and the space underneath the piston communicates with the atmosphere through an opening 58. In the upper wall of the cylinder is an adjusting screw 55 which prevents the spring 57 from being fully expanded. The lines 41 and 35 open into the upper part of the cylinder.

In the position shown in FIG. 2 the pressure in the line 47 is slight and the position of the three-way valve 36 is therefore such that the line 45 communicates with the lines 19 and 48 which are thus under pressure. As a result the position of the three-way valve 37 is such that the line 53 does not communicate with the line 52 and the whistle 33 does not operate and no gas is used from the gas cylinder 29, while the position of the four-way valves 38 is such that the lines 49 and the opening lines 51 communicate and the closing lines 50 communicate with the atmosphere so that the valves 40 are kept in the open position.

When the line 47 is subjected to pressure the three-way valve 36 is reversed and communication is then established between the lines 19 and 48 and the atmosphere, thus causing the pressure in these lines to cease and the three-way valve 37 and the four-way valves 38 to be reversed. The whistle 33 is then brought into operation and the valves 40 are closed.

The pressure in the line 47 is controlled by the relay 32. The construction thereof is such a type that as soon as the pressure in the line 46 exceeds a predeterminable value $p_s$, communication is established between the lines 44 and 47 and is maintained, even after the pressure in line 46 is reduced to less than $p_s$, until the reset knob 54 is operated. Such a relay is known as a snap acting relay and is described in an article by Dr. Friedrich Wilhelm Warnecke in Chemische Industrie, No. 9/1960, in particular from FIG. 10 of this article.

The construction of the differential pressure transmitter 31 is such that under the influence of the pressure in the line 43 the pressure in the line 46 is greater in proportion as the pressure in the auxiliary line 35 exceeds the pressure in the line 17, a small amount of gas escaping from the gas cylinder 34. Such a differential pressure transmitter is known, for example, from Bulletin No. 215 of the Worthington Corporation, Mason-Neilon Division, "Differential Pressure Transmitter."

When a constant operating pressure $p_h$ prevails in the main line 15 the pressure in the auxiliary lines 17 and 35 is equal thereto and the pressure in the line 46 is therefore slight. The same operating pressure $p_h$ also prevails in the expansion chamber 30 and when this pressure is sufficiently high the piston 56 is not in contact with the adjusting screw 55. This adjusting screw is so set that at a pressure of $p_1$ in the expansion chamber 30 the piston is in contact with the adjusting screw 55.

If the pressure in the main line 15 drops rapidly from a value $p_h$, which is at least equal to a predeterminable value $p_o$, to a value lower than $p_1$, then the pressure in the auxiliary line 17 will also drop rapidly but the pressure in the auxiliary line 35 will at first drop less rapidly so that the pressure in the auxiliary line 35 will for some time be higher than the pressure in the auxiliary line 17. As a result, the pressure in the line 46 rises to above $p_s$ and the relay 32 is actuated, causing the whistle 33 to sound an alarm signal and the valves 40 to close. The whistle 33 continues to operate until the reset knob 54 is operated or the gas cylinder 29 is empty.

If the pressure in the main line 15 only decreases gradually, at least at first, then only a small pressure difference will arise between the pressures in the auxiliary lines 35 and 17, the pressure in the line 46 does not then reach the value $p_s$. As a result of the slow decrease in pressure in the main line 15 the pressure in the expansion chamber 30 in fact decreases more slowly until the piston 56 comes into contact with the adjusting screw 55; the pressure in the expansion chamber 30 then decreases very rapidly until the pressures in the auxiliary lines 17 and 35 are again equal. A subsequent further, possibly rapid, reduction in the pressure in the main line 15 can afterwards cause no difference between the pressures in the auxiliary lines 35 and 17.

The restriction 42 and the expansion chamber 30 together form a resistance-capacity system having a lag (in seconds) which may be defined as the volume which, under the influence of a certain difference in pressure per second, flows through the restriction and multiplied by the reduction in volume of the expansion chamber when the pressure in the expansion chamber decreases by the said pressure difference.

The restriction 42, the adjusting screw 55, the differential pressure transmitter 31 and the relay 32 should be so set that if the hose ruptures the relay 32 is actuated, but when a valve in the transport line is gradually closed the relay 32 is not actuated.

Now, if the hose ruptures the pressure in the main line decreases very rapidly, while when the valve in the transport line gradually closes the pressure decreases slowly (at least at first).

Reliable operation of the signal device may, for example, be ensured when the lag of the combination of the restriction 42 and expansion chamber 30 is in the order of magnitude of 10 seconds; the adjusting screw 55 is so set that the piston 56 abuts against the adjusting screw at a pressure $p_1$, which is 80% to 85% of the lowest operating pressure $p_o$ for which the signal device is designed and the pressure in the line 46 reaches the value $p_s$ at which the relay 32 is actuated at a pressure difference in the auxiliary lines 35 and 17 of 70% to 80% of the pressure $p_o$.

When the lag is increased the device becomes more sensitive, and in particular more sensitive to slow pressure decreases. Decrease of $p_1$ also makes the device sensitive to a rapid pressure decrease following a slow pressure decrease. Decrease of $p_s$ also makes the device sensitive to slow pressure decreases. In view of these effects, however a certain degree of deviation is possible from the figures quoted above. If the hose ruptures the piston 56 should preferably abut against the adjusting screw 55 approximately 1½ seconds after the pressure begins to fall in the auxiliary line 17.

On the other hand, it should preferably take not less than about half a minute to close the valves in the transport line.

It is desirable to calibrate the adjustable restriction 42, the adjusting screw 55, the differential pressure transmitter 31 and the relay 32 so that the set values may be read. The presence of pressure meters of the main line 15 and the line 43 is also desirable, on the first because the actual operating pressure $p_h$ in the main line should preferably be known, and on the second because the operation of the entire signal device depends on the pressure in the line connected to the gas cylinder 34. The degree of filling of the gas cylinders 29 and 39 should also be controllable. Valves should also be arranged in several lines so that the signal device may be put temporarily out of operation, for instance, in order to replace the gas cylinder 34 or when no liquid is being transported through the main line 15. Since the differential pressure transmitter 31 is constantly consuming some gas from the cylinder 34 this gas cylinder may become empty too soon with the result that there is no pressure in the lines 19 and 48.

If a tanker is being unloaded by means of the ship's pumps and the booster pumps 8 and at least one of the hoses 11 or 5 ruptures some of the oil present in the relevant hose or hoses will at first find its way into the sea. By the action of the booster pumps 8, however, the oil in the line section between the leakage and the shore cannot leak away, but sea water might be sucked up into the line.

The sudden pressure drop in the main line 15 caused by the leakage actuates the air whistle 33, warning the personnel on board the tanker and on or near the loading buoy, while the closure of the valves 40 prevents further supply of oil. It will be understood that the air whistle 33 or the valves 40 may be sufficient, while use may also be made of other warning systems and/or safety measures; a number of suitable devices may be connected to the lines 19 and/or 48.

If a tanker is being loaded only the shore pumps are used. The valves 40 may then be omitted or be replaced by similar valves in the pipelines 6. The air whistle 33 will also in this case be capable of warning the personnel in the neighborhood who can then warn the shore personnel by light or radio signals.

The emptying of the pipelines 6 is prevented by the provision of upwardly directed bends 20 and horizontally extending wings or plates 21 (to prevent tilting) at the end of these lines near the connection with the hoses 5 which prevent the heavier sea-water from driving out the oil in the line.

When water-containing crude oil is being transported, water from the main line 15 may penetrate into the lines 17, 41 and 35. Since the lag of the combination of restriction 42 and expansion chamber 30 depends on the viscosity of the liquid flowing through the restriction, it is advisable to fill the lines 17, 41 and 35 and the expansion chamber as soon as they start to operate, for instance, with salt water, to which end suitable means should be provided.

In addition, the slope and the connection of the lines 17, 41 and 35 should be such that any gas or vapor bubbles can reach the main line 15.

I claim as my invention:

1. A loading buoy with at least one main line for loading and unloading fluids from a floating tank, said buoy comprising:
    a floating loading buoy having at least said one main line for connecting the loading buoy to the floating tank;
    a differential pressure transmitter means mounted on said loading buoy for comparing two pressures and supplying an output signal when the pressures differ by more than a preset amount;
    said differential pressure transmitter being connected to said main line through a first conduit and to said main line through a second conduit;
    a restriction means, said restriction means being disposed in said second conduit;
    said differential pressure transmitter supplying an output signal only when the pressures in said unrestricted and restricted conduits differ by more than said preset amount.

2. The loading buoy of claim 1 including an expansion chamber, said expansion chamber being disposed in said second conduit between said restriction and said differential pressure transmitter means.

3. The loading buoy of claim 2 wherein said expansion chamber comprises a closed chamber having a movable wall dividing said chamber into two compartments, resilient means in one compartment for resisting movement of said wall in one direction and said second conduit communicating with the other compartment.

4. The loading buoy of claim 3 wherein said expansion chamber is formed by a cylinder having a movable piston disposed therein; a compression spring disposed within said cylinder on one side of said piston to urge said piston in one direction; an adjustable stop mounted in said cylinder to limit the expansion of said spring; and said second conduit communicating with the cylinder on the other side of the piston.

5. The loading buoy of claim 2 wherein said expansion chamber, said first and said second conduits are filled with a liquid other than the fluid being handled by the buoy.

6. The loading buoy of claim 2 and in addition a pneumatic snap acting relay, a source of pressurized pneumatic fluid, said source of pneumatic fluid being coupled to said relay and said relay being coupled to said differential pressure transmitter.

7. The loading buoy of claim 6 and in addition an audible alarm device, said alarm device being coupled to said relay to be operated thereby.

References Cited by the Examiner

UNITED STATES PATENTS

| | | | |
|---|---|---|---|
| 630,002 | 8/99 | Nethercott et al. | 116—55 |
| 1,733,149 | 10/29 | Campbell | 116—55 |
| 2,894,268 | 7/59 | Griebe | 9—8 |
| 3,077,615 | 2/63 | Schultz | 9—8 |

LOUIS J. CAPOZI, *Primary Examiner.*